(12) United States Patent
Huang et al.

(10) Patent No.: US 11,478,867 B2
(45) Date of Patent: Oct. 25, 2022

(54) MACHINING DEVICE FOR DUPLEX GEAR OF HIGH-PRECISION REDUCER FOR ROBOT, AND USE METHOD THEREOF

(71) Applicant: Beijing Institute of Technology, Beijing (CN)

(72) Inventors: Qiang Huang, Beijing (CN); Xuxiao Fan, Beijing (CN); Richeng Huang, Beijing (CN); Chenglong Tang, Beijing (CN); Fei Meng, Beijing (CN)

(73) Assignee: Beijing Institute of Technology, Beijing (CN)

( * ) Notice: Subject to any disclaimer, the term of this patent is extended or adjusted under 35 U.S.C. 154(b) by 87 days.

(21) Appl. No.: 16/889,539

(22) Filed: Jun. 1, 2020

(65) Prior Publication Data

US 2020/0376576 A1 Dec. 3, 2020

(30) Foreign Application Priority Data

May 30, 2019 (CN) .......................... 201910462823.9

(51) Int. Cl.
*B25B 5/14* (2006.01)
*B23F 1/06* (2006.01)
(Continued)

(52) U.S. Cl.
CPC ............ *B23F 1/06* (2013.01); *B23K 26/0823* (2013.01); *B23K 37/047* (2013.01);
(Continued)

(58) Field of Classification Search
CPC . B23F 1/06; B23K 2101/008; B23K 26/0823; B23K 26/21; B23K 37/047; F16H 57/023
(Continued)

(56) References Cited

U.S. PATENT DOCUMENTS 3,786,224 A * 1/1974 Heywang ............... H01G 13/06
269/57
4,958,177 A * 9/1990 Akitake .................. G03B 3/10
74/665 GA
(Continued)

FOREIGN PATENT DOCUMENTS

CN 1597231 3/2005
CN 101722366 6/2010
(Continued)

OTHER PUBLICATIONS

First Office Action and Search report, dated Feb. 3, 2020 in the corresponding Chinese patent application No. 201910462823.9, 11 pages.

*Primary Examiner* — Sang Y Paik
(74) *Attorney, Agent, or Firm* — Hamre, Schumann, Mueller & Larson, P.C.

(57) ABSTRACT

A machining device for duplex gear of high-precision reducer for robot includes a laser welding device, a laser rotary support, a rotary mechanism and a rotary platform, the rotary mechanism being installed with a reducer body, wherein a center of a central gear is fixedly connected with a rotating shaft; sets of duplex gears are evenly disposed around the central gear; the gear of each set of duplex gear which is connected with the central gear are connected to an output gear ring from outside; a fixed gear ring is disposed above the output gear ring; a rotating frame is disposed at ends, close to the top of the reducer, of rotating shafts of the sets of duplex gears and the rotating shaft of the central gear.

8 Claims, 5 Drawing Sheets

(51) Int. Cl.
*B23K 26/08* (2014.01)
*F16H 57/023* (2012.01)
*B23K 37/047* (2006.01)
B23K 26/21 (2014.01)
B23K 101/00 (2006.01)

(52) U.S. Cl.
CPC ............ *F16H 57/023* (2013.01); *B23K 26/21* (2015.10); *B23K 2101/008* (2018.08)

(58) Field of Classification Search
USPC .............................. 269/36; 219/126.1–126.82
See application file for complete search history.

(56) References Cited

U.S. PATENT DOCUMENTS

| | | | | |
|---|---|---|---|---|
| 7,538,296 | B2* | 5/2009 | Elfizy | ................ B23K 26/0884 |
| | | | | 219/121.7 |
| 7,728,255 | B2* | 6/2010 | Liu | ...................... G02B 6/0065 |
| | | | | 219/121.76 |
| 2009/0186736 | A1* | 7/2009 | Ta | .......................... A47K 13/10 |
| | | | | 475/153 |

FOREIGN PATENT DOCUMENTS

| | | |
|---|---|---|
| CN | 202780988 | 3/2013 |
| CN | 103506761 | 1/2014 |
| CN | 203751525 | 8/2014 |
| JP | 07100233 | 11/1995 |

\* cited by examiner

MACHINING DEVICE FOR DUPLEX GEAR OF HIGH-PRECISION REDUCER FOR ROBOT, AND USE METHOD THEREOF

TECHNICAL FIELD

The present disclosure belongs to the field of machinery, and particularly to a machining device for duplex gears of a high-precision reducer for a robot, and a use method thereof.

BACKGROUND ART

The high-precision reducer used at the joint of the current bionic robot requires a high rotation precision, a reliable impact load resistance, a light weight and a high torque bearing capacity. The reducer for a bionic robot generally has a small volume, wherein a gear modulus is between 0.2 and 1, so an outer diameter of a gear is very small, and a distance between the two gears of a set of duplex gears is usually from 1 mm to 3 mm. Since the distance is too small, the gears cannot be clamped and machine-shaped at one time using any hob and grinding wheel. It is necessary to align the gears after the machining the gears, and then the conventional gear aligning tool welds the gears after fixing a phase angle between the gears. However, one reducer uses at least three sets of such gears, and each set has errors in the phase angle. As a result, the gear precision after the gear alignment is degraded by at least one precision level, the transmission system gets stuck and generates heat, and the reducer has its service life decreased to be unusable.

For the reducer used by the joint of the current bionic robot, since the output return difference needs to be controlled within 3 arcmin and the speed ratio is required to be between 10 and 60, the single-stage planetary transmission cannot meet the requirements, and multi-stage planetary tandem or other transmission forms, such as differential planetary transmission with duplex gears, should be adopted. However, the rotation precision will be greatly decreased in the case of the multi-stage planetary tandem. In the case of the differential planetary transmission with duplex gears, when considering the influence of the accumulated errors of the tooth alignment, tooth trace and circular pitch of the gear, the duplex gears produced in the traditional machining process cannot meet the precision requirement of the reducer for the bionic robot. Although the gear shaping can be adopted in the current stage of single clamping duplex gears machining, the gear shaping has a low precision, and the gear shaping has a low efficiency and s high cost. In the large-scale production, it is necessary to design a special gear aligning machine, measure the tooth surfaces of the two gears with a contact probe, and align the gears according to space coordinate values of the tooth surfaces. However, due to the tolerance of the tooth thickness on each tooth surface, there are still errors when aligning the gears in this way, and the gear precision will be decreased.

Therefore, during the implementation of the technical solutions in the embodiment of the present disclosure, the inventor finds that the above technology has at least the following technical problems:

In the existing solution, a gear aligning tool or a special gear aligning machine is generally adopted, which can only align one set of duplex gears at a time. But in fact, the planetary gear reducer uses at least three or more set of duplex gears, while in the traditional gear aligning process, due to certain errors of the separately machined gears, the errors of each set of duplex gears are random, and the conditions of assembling in sets according to the error grades are not available during the assembly. As a result, the overall performance of the reducer is degraded and the use requirement cannot be satisfied.

SUMMARY OF THE INVENTION

Embodiments of the present disclosure provide a machining device for duplex gear of a high-precision reducer for a robot with a simple structure and a high precision, and a use method thereof, which are particularly suitable for duplex gears of a high-precision reducer for a robot.

One aspect of the present disclosure provides a machining device for duplex gear of a high-precision reducer for a robot, comprising: a laser welding device, a laser rotary support, a rotary mechanism and a rotary platform; the rotary mechanism is installed with a reducer body which comprises a first set of duplex gears, a second set of duplex gears, a third set of duplex gears, a central gear, an output gear ring, rotating frame welding gaps, a fixed gear ring and a rotating frame; the center of the central gear is fixedly connected with a rotating shaft; the first set of duplex gears, the second set of duplex gears and the third set of duplex gears are disposed around the central gear at an equal interval;

Each set of the duplex gears comprises a first gear and a second gear disposed coaxially; the central gear is connected with the first set of duplex gears, the second set of duplex gears and the third set of duplex gears through the second gear of each set of the duplex gears; the first set of duplex gears, the second set of duplex gears and the third set of duplex gears are connected with the output gear ring through a first gear ring of each set of the duplex gears; the fixed gear ring is disposed above the output gear ring and connected with each set of the duplex gears through the second gear;

the rotating frame is disposed at ends, close to the top of the reducer, of rotating shafts of the first set of duplex gears, the second set of duplex gears, the third set of duplex gears and the central gear; the rotating frame welding gaps are formed in positions, close to respective rotating shafts of duplex gears, on the side edge of the rotating frame, so as to partly expose respective duplex gears and the rotating shafts thereof;

the rotary mechanism is disposed at a center of the rotary platform, the rotary mechanism is fixedly connected with the rotating shaft of the central gear, the laser rotary support is disposed on the rotary platform and close to a side surface, the laser welding device is disposed on the top of the laser rotary support, and a welding head of the laser welding device can be disposed directly above the rotating frame welding gap.

In one embodiment of the present disclosure, two gears of each of the first set of duplex gears, the second set of duplex gears and the third set of duplex gears are in transition fit with the rotating shaft thereof, and the first set of duplex gears, the second set of duplex gears, the third set of duplex gears and the central gear have fine-pitch high tooth profiles.

In one embodiment of the present disclosure, through holes are formed in positions corresponding to the rotating shafts of respective duplex gears at the top of the rotating frame.

In one embodiment of the present disclosure, an outer side of the output gear ring is disposed as a wave shape, and a through hole is disposed at a center of each convex portion.

In one embodiment of the present disclosure, the machining device further comprises a carrying platform disposed over the rotary mechanism to install the reducer body.

In one embodiment of the present disclosure, the number of the rotating frame welding gaps is the same as the number of the sets of duplex gears.

One aspect of the present disclosure provides a use method of the machining device for duplex gear of a high-precision reducer for a robot, comprising: connecting the reducer body with the rotary mechanism through the rotating shaft of the central gear, and fixing the output gear ring and the rotating frame; starting the rotary mechanism to drive the central gear to rotate, wherein the central gear drives the first set of duplex gear, the second set of duplex gear and the third set of duplex gear to rotate, and the first set of duplex gear, the second set of duplex gear and the third set of duplex gear are aligned in the rotating process; and after the alignment, welding the first set of duplex gear, the second set of duplex gear and the third set of duplex gear by the laser welding device.

In one embodiment of the present disclosure, tooth surfaces of the first duplex gear, the second duplex gear, the third duplex gear and the central gear are nitrided.

According to some embodiments of the present disclosure, three set of duplex gears are pre-installed on the reducer and can be directly aligned at the same time, the problems of sticking and heating of the transmission system and the reduction of the service life of the reducer caused by the errors generated by respectively aligning and welding the three duplex gears are effectively solved, thereby eliminating the phase angle error, ensuring the machining precision of the duplex gears, and ensuring the output precision and the machining precision of the reducer.

In which,

| 1: laser welding device; | 2: laser rotary support; | 3: rotary mechanism; |
|---|---|---|
| 4: rotary platform; | 5: reducer body; | 6: first set of duplex gears; |
| 7: second set of duplex gears; | 8: central gear; | 9: third set of duplex gears; |
| 10: output gear ring; | 11: rotating frame welding gap; | 12: fixed gear ring; |
| 13: rotating frame; | 31: carrying platform; | 32: pin; |
| 33: shaft end retaining ring; | 60: planetary gear shaft; | 61: first gear; |
| 62: second gear; | 101: wavy projection; | 102: through-hole or blind hole; |
| 301: motor output shaft; | 302: coupling. | |

DETAILED DESCRIPTION OF THE PREFERRED EMBODIMENTS

The present disclosure will be described in detail with reference to the drawings.

Figure 1:
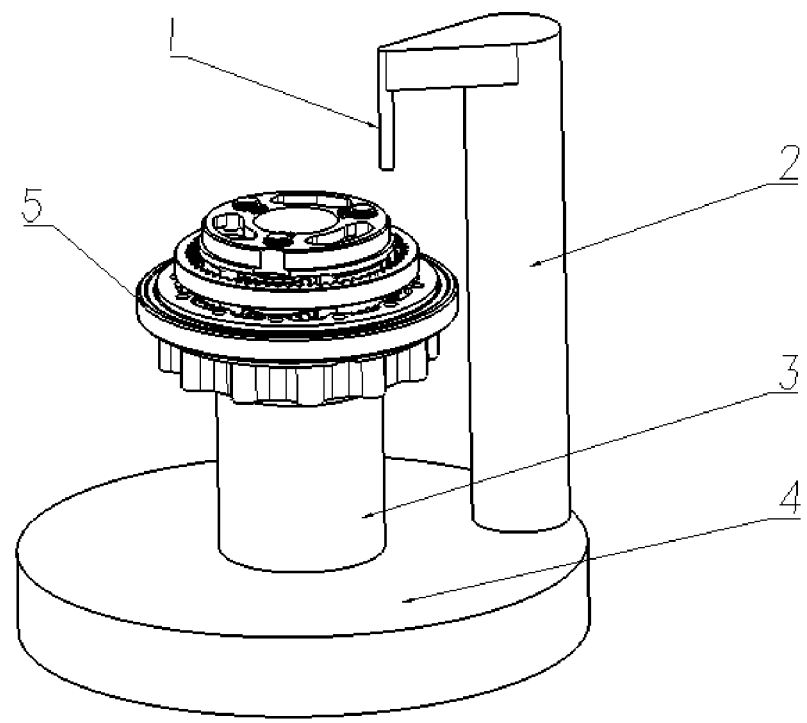
FIG. 1 is a structural diagram showing a machining device and a reducer body according to an embodiment of the present disclosure.
Figure 2:
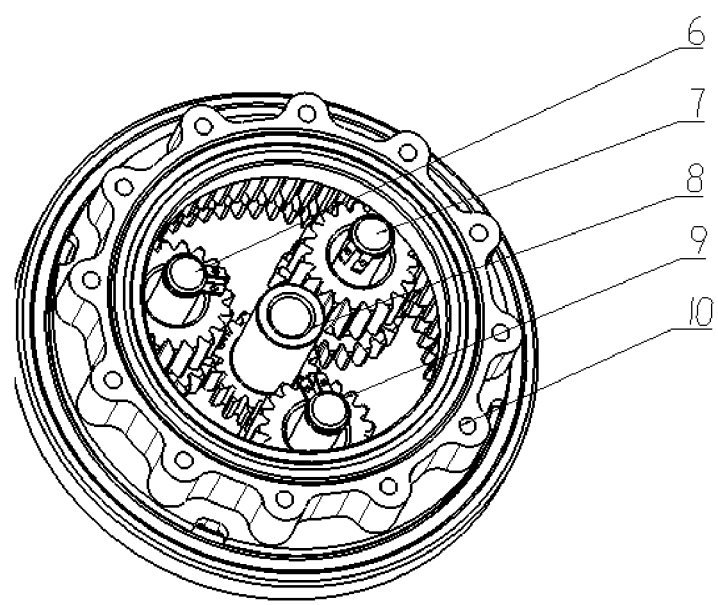
FIG. 2 is a schematic diagram showing duplex gears on a reducer according to an embodiment of the present disclosure.
Figure 3:
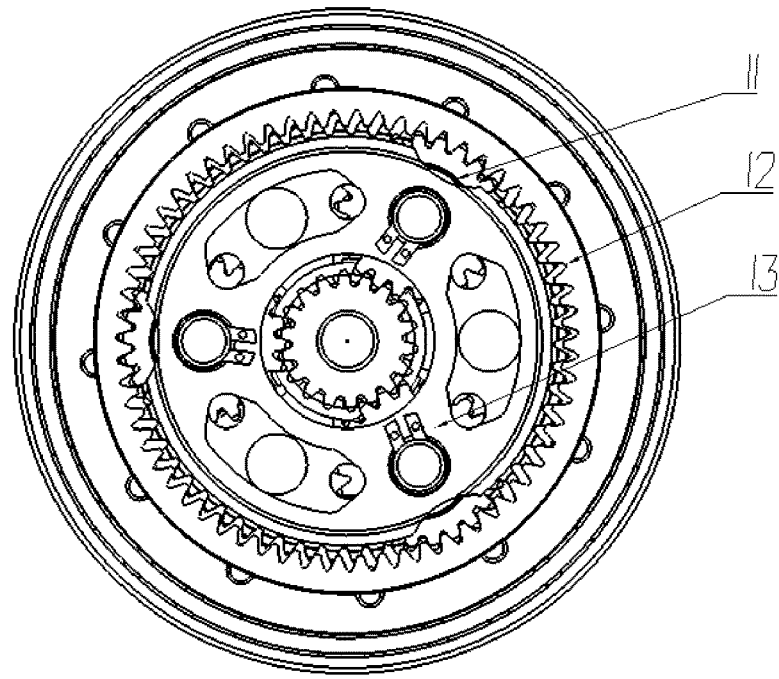
FIG. 3 is a diagram showing position relationships among installed duplex gears, a rotating frame and a gear ring of the machining device according to an embodiment of the present disclosure.

As illustrated in FIGS. 1 to 3, the embodiments of the present disclosure provide a machining device for duplex gear of a high-precision reducer for a robot and a use method thereof. By adjusting and controlling the work of the reducer, it solves the problems of the reduction of the precision and the degradation of the performance of the reducer caused by the installation errors and the gear alignment errors when the duplex gears are respectively machined, then installed and finally welded in the prior art. Several sets of duplex gears are directly aligned on the reducer in synchronization, so that the phase angle errors are eliminated, and the installation errors are avoided at the same time, thereby ensuring the output precision and performance of the reducer.

The machining device in the embodiments of the present disclosure may comprise a laser welding device 1, a laser rotary support 2, a rotary mechanism 3, a rotary platform 4, and a fixture tool. The fixture tool may be a rotating frame 13, which is mainly configured to fix sets of planetary gears of a reducer body. The rotating frame 13 can be realized by a planetary retainer of the reducer by machining several gaps (i.e., rotating frame welding gaps 11) corresponding to the several sets of duplex gears to be welded on the planetary retainer, and the laser welding device 1 in the embodiments of the present disclosure can weld the duplex gears through the gaps. A welding head of the laser welding device 1 can be disposed directly above the rotating frame welding gap 11.

The reducer body 5 in the embodiments of the present disclosure may comprise a central gear 8, several sets of duplex gears (e.g., a first set of duplex gears 6, a second set of duplex gears 7, and a third set of duplex gears 9), a fixed gear ring 12, and an output gear ring 10. The central gear 8 serves as a sun gear, the duplex gears serve as the planetary gears, and the several sets of duplex gears are disposed between the central gear 8 and the fixed gear ring. In practical applications, the central gear 8 may serve as an input end of the reducer, and the output gear ring 10 may serve as an output end of the reducer. The first set of duplex gears 6, the second set of duplex gears 7, the third set of duplex gears 9 and the central gear 8 may have fine-pitch high tooth profiles. A first gear 61 of each set of duplex gears may engage with the output gear ring 10, and a second gear 62 of each set of duplex gears may engage with the fixed gear ring 12. After the reducer body 5 is installed in the machining device, each set of duplex gears is arranged such that the second gear 62 is located above the first gear 61 to facilitate the welding of the second gear 62 by the laser welding device 1. The machining device in the embodiments of the present disclosure is mainly used to weld the second gears of these duplex gears on corresponding planetary gear shafts to maintain the phase relationship with the first gears and ensure their position accuracy.

Each set of the duplex gears of the high-precision reducer for the bionic robot has a high phase relationship requirement on the two gears. In order to meet the position accuracy requirement of the duplex gears, the first gear 61 of each set of duplex gears may be fixed on or sleeved on the planetary gear shaft 60 (or called as a rotating shaft). The second gear 62 is disposed to sleeve the circumference of the planetary gear shaft 60 in a manner of rotatable relative to the planetary gear shaft 60 (such as in a transition fit or a small clearance fit), and then a process of gear alignment before welding is adopted for the machining device to effectively ensure the position precision.

In the embodiments of the present disclosure, the planetary gear structure of the reducer is installed on the machining device, driven to rotate through the rotary mechanism 3 to complete the gear alignment so as to meet the phase requirement; next, the laser welding device 1 is utilized to weld the second gears 62 of the several sets of duplex gears to the planetary gear shaft 60.

The first set of duplex gears 6, the second set of duplex gears 7 and the third set of duplex gears 9 mentioned here refer to three set of duplex planetary gears, but the present disclosure is not limited thereto, and the number of the sets of planetary gears of the planetary gear system may be set based on actual needs. Correspondingly, the number of the rotating frame welding gaps 11 of the rotating frame 13 as the fixture tool is the same as the number of the sets of planetary gears.

Figure 4:
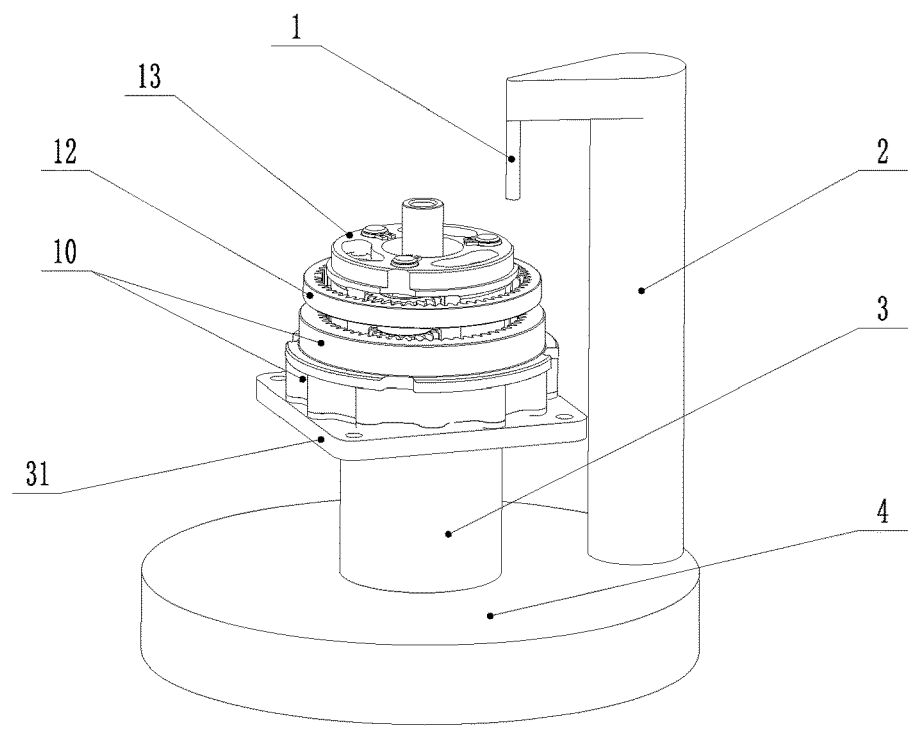
FIG. 4 is a structural diagram showing a machining device and a reducer body according to another embodiment of the present disclosure.

In the embodiments of the present disclosure, the reducer body is installed on the rotary mechanism 3 of the machining device, and the installation mode enables the output gear ring 10 of the reducer body to be fixed or rotatable relative to the rotary mechanism 3. In one embodiment, as illustrated in FIG. 4, the reducer body may be installed on the machining device through a carrying platform 31.

Figure 10:
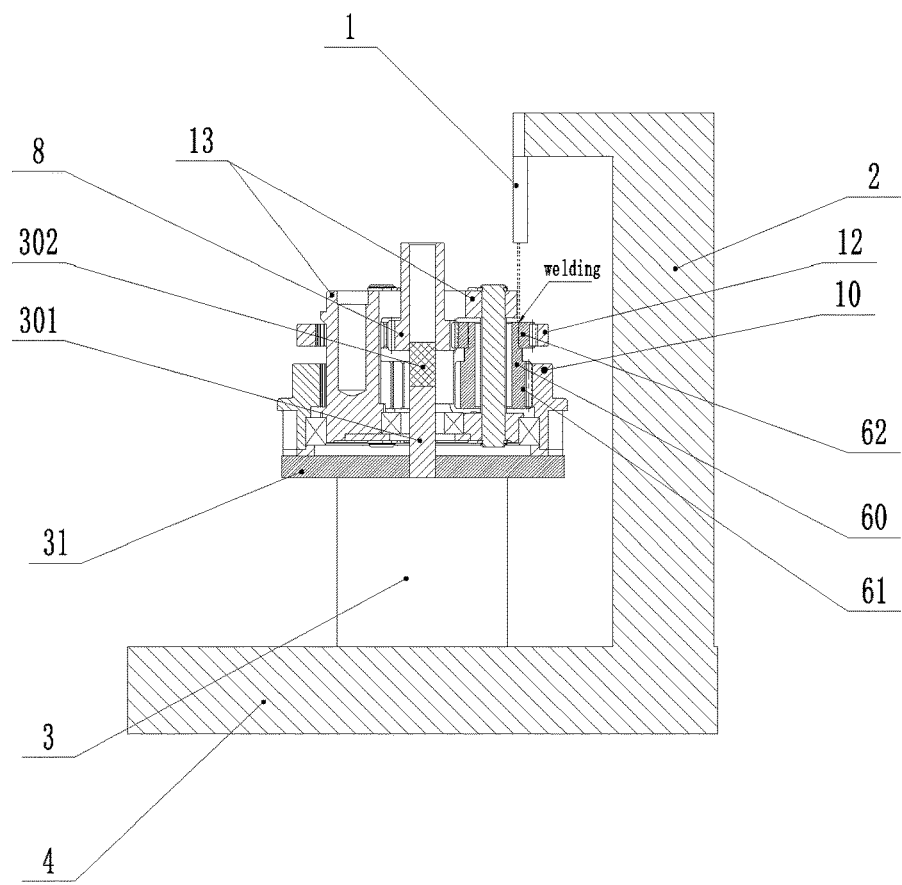
FIG. 10 is a cross-sectional view showing parts of a machining device and a reducer along an axis of a set of duplex gear.

FIG. 10 is a cross-sectional view showing parts of a machining device and a reducer along an axis of a set of duplex gears. As illustrated in FIG. 10, the second gears 62 of the first set of duplex gears 6, the second set of duplex gears 7 and the third set of duplex gears 9 are respectively disposed to sleeve corresponding planetary gear shafts 60. At this time, the first gear 61 is fixed with the planetary gear shaft 60, and the second gear 62 is rotatable relative to the planetary gear shaft 60. Next, the three set of duplex gears are installed into the reducer body 5. The second gears 62 of the first set of duplex gears 6, the second set of duplex gears 7 and the third set of duplex gears 9 may be installed in transition fit with the planetary gear shaft 60, and the first gear 61 and the second gear 62 are fixed by welding after the gear alignment, thereby realizing an assembly process of the reducer, and also avoiding an installation error occurred in the assembly process. That is, using the machining device, the reducer is installed firstly, and then aligned and welded, which avoids the installation error of the conventional reducer caused by machining the duplex gears before assembling the reducer.

In one embodiment, the carrying platform of the machining device can used to support the output gear ring 10 of the reducer. The output gear ring 10 may rotate circumferentially, and the fixed gear ring 12 may remain fixed by the carrying platform 31 or other structure, and the rotating frame 13 may rotate circumferentially. The machining device may also add a constant damping to the circumferential rotation of the output gear ring 10 through some other structures (such as external friction linings). The rotary mechanism 3 on the rotary platform 4 is controlled to drive the central gear 8 to rotate, and a motor may be disposed inside the rotary mechanism 3. A motor output shaft 301 may drive the central gear 8 of the reducer body 5 through a coupling 302, and the central gear 8 synchronously drives the second gears 62 of the first set of duplex gears 6, the second set of duplex gears 7 and the third set of duplex gears 9 to rotate. The planetary gear shaft 60 rotates to drive the output gear ring 10 to rotate through the first gear 61 of each set of the duplex gears. During the rotation, through the cooperation with the rotating frame 13, the two gears of each set of duplex gears produce adaptive phase angles during the relative rotation. At the same time, the three set of planetary gears, i.e., the first set of duplex gears 6, the second set of duplex gears 7 and the third set of duplex gears 9 produce an identical phase angle under the same rotational speed and torque, thereby avoiding the gear alignment error and ensuring the precision of the reducer, and ensuring the high precision of the reducer. The constant damping of the output gear ring 10 also helps to avoid the gear alignment error.

The final welding process is carried out through the laser welding device 1 and a rotating frame welding gap 11 on the rotating frame 13. The laser welding device 1 is connected with the rotary platform 4 through a laser rotary support 2 which is a hollow cylindrical support. During the welding, the reducer body 5 keeps the final state of the gear alignment, and the completion of the welding will not affect the precision and performance of the reducer body 5.

In one embodiments of the present disclosure, the fixed gear ring 12 may remain fixed. Each set of duplex gears can not only rotate around the shafts thereof, but also can revolve around the central gear 8, and therefore the rotating frame 13 may rotate circumferentially. The laser welding device 1 needs to align the rotating frame welding gap 11 with a position to be welded on the matching surface between the second gear 61 and the planetary gear shaft 60, and the laser welding device 1 can keep synchronous with the rotating frame 13 via the laser rotary support 2, so as to perform the welding.

In another embodiment of the present disclosure, after the machining device finishing gear alignment, the motor inside the rotary mechanism 3 is stopped, the laser welding device 1 can perform the welding in the case that the duplex gears and the rotating frame are in a still state.

In order to better understand the above technical solution, the machining process of machining device for duplex gears of the reducer will be described in detail as follows with reference to the drawings of the specification and the specific embodiments.

Figure 9:
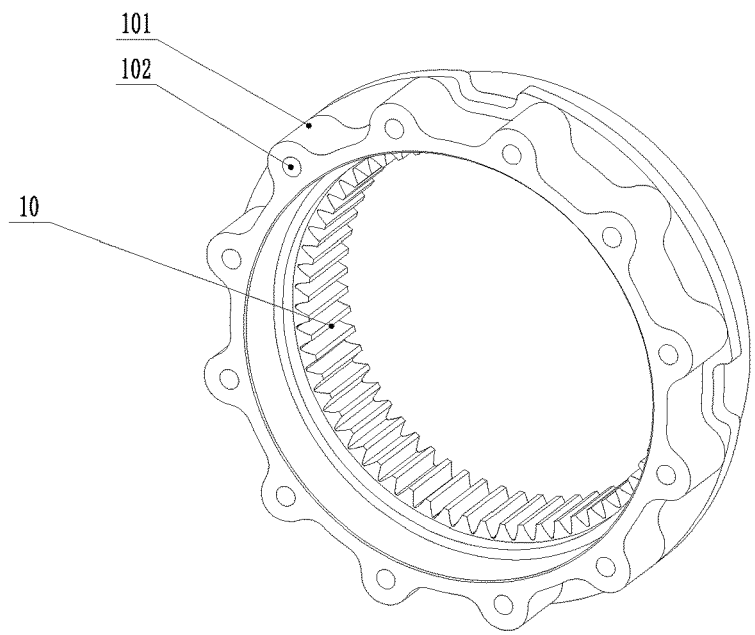
FIG. 9 is a stereo structure diagram showing an output gear ring according to an embodiment of the present disclosure.

Firstly, the first set of duplex gears 6, the second set of duplex gears 7 and the third set of duplex gears 9 are installed inside the reducer body 5, and the rotating shaft of the central gear 8 of the reducer body 5 is installed on the rotary mechanism 3. Then, the rotating shafts of the first set of duplex gears 6, the second set of duplex gears 7 and the third set of duplex gears 9 are installed on the rotating frame 13. The reducer body 5 is installed on the machining device, and the fixed gear ring 12 may remain fixed, and the output gear ring 10 and the rotating frame 13 may rotate circumferentially. As illustrated in FIG. 4, the output gear ring can be installed on the carrying platform 31. As illustrated in FIG. 9, a wave-shaped protrusion 101 on an outer periphery of the output gear ring 10 is provided with through holes or blind holes 102, which can be connected with the carrying platform 31 by bolts or screws. When central gear is in the rotating state, the carrying platform 31 and the output gear ring 10 both rotate circumferentially. The carrying platform 31 may be annular or rectangular.

A constant torque is provided for the central gear 8 of the reducer by the rotary mechanism 3 in the embodiments of the present disclosure. This torque is required to ensure that the two gears of each set of the duplex gears can rotate relatively, because the second gear or both gears of each set of the duplex gears are in transition fit with the rotating shaft (planetary gear shaft), and can rotate relatively when the torque reaches a certain magnitude. During the rotation, the gears are in full contact at the positions being contact fit with each other. The first set of duplex gears 6, the second set of duplex gears 7 and the third set of duplex gears 9 are evenly distributed with the torque of the central gear 8. The first set of duplex gears 6, the second set of duplex gears 7 and the third set of duplex gears 9 are in alignment dynamically during rotation. When the first set of duplex gears 6, the second set of duplex gears 7 and the third set of duplex gears 9 reach an optimal rotation and fit state and the gear alignment is finished, an output torque of the rotary mechanism 3 is constant without any fluctuation, and finally the laser welding device 1 carries out welding works through the rotating frame welding gap 11 of the rotating frame 13, and the gear alignment, installation and welding works for the reducer is finished at this moment.

Figure 6:
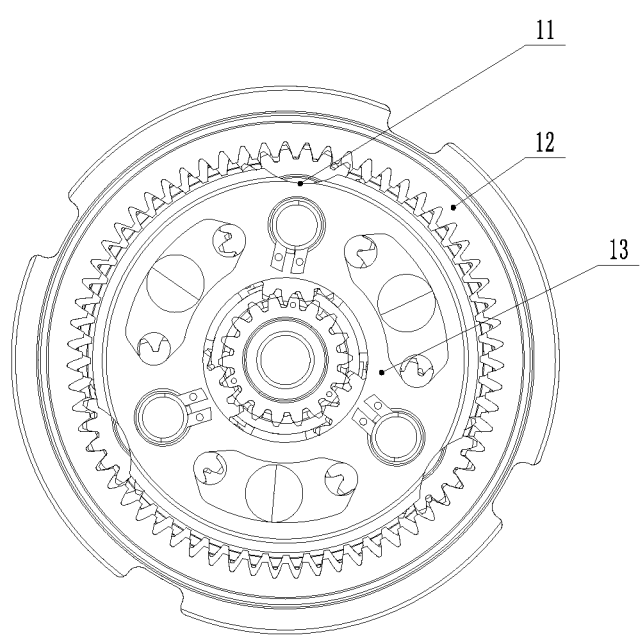
FIG. 6 is a diagram showing position relationships among installed duplex gears, the rotating frame and the gear ring according to an embodiment of the present disclosure.
Figure 7:
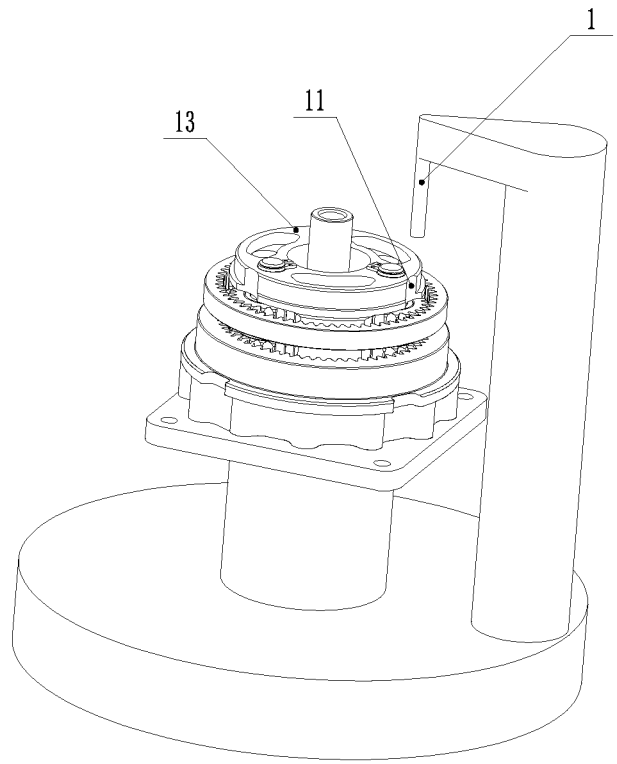
FIG. 7 is a stereo structure diagram showing a processing device installed with a reducer according to another embodiment of the present disclosure.
Figure 8:
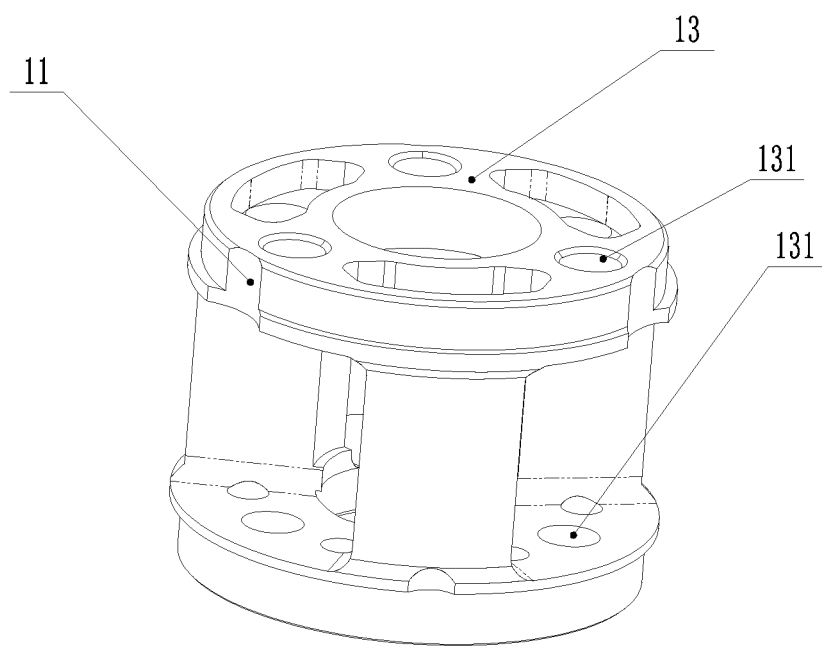
FIG. 8 is a stereo structure diagram showing a rotating frame according to an embodiment of the present disclosure.

As illustrated in FIGS. 6, 7 and 8, the rotating frame welding gaps 11 of the rotating frame 13 can be configured to expose shapes of partial sides of the second gears of the first set of duplex gears 6, the second set of duplex gears 7 and the third set of duplex gears 9. Under the positioning and clamping by the fixture tool of the machining device, the second gear of each set of the duplex gears only rotates about its own axis, rather than revolving around the central gear 8. The laser welding device 1 can keep rotating synchronously with the rotating frame 13 via the laser rotary support 2. Therefore, the laser welding device 1 may perform welding on the second gear of each set of the duplex gears through the rotating frame welding gaps 11.

In some embodiments, the laser welding device 1 may be rotated through the laser rotary support 2 about the rotary mechanism 3 as an axis to weld the three set of duplex gears using the three rotating frame welding gaps 11 of the rotating frame respectively.

In some embodiments, the rotating frame 13 serves as a fixture tool of the machining device. In some other embodiments, the central gear, the fixed gear ring, and the output gear ring may also serve as a fixture tool of the machining device. In this case, because of the gaps, they are not used as components of the reducer in the actual use. In other cases, the central gear, the fixed gear ring and the output gear ring may also be used as components of the reducer, and assembled into the reducer after the gear alignment and welding are completed.

Figure 5:
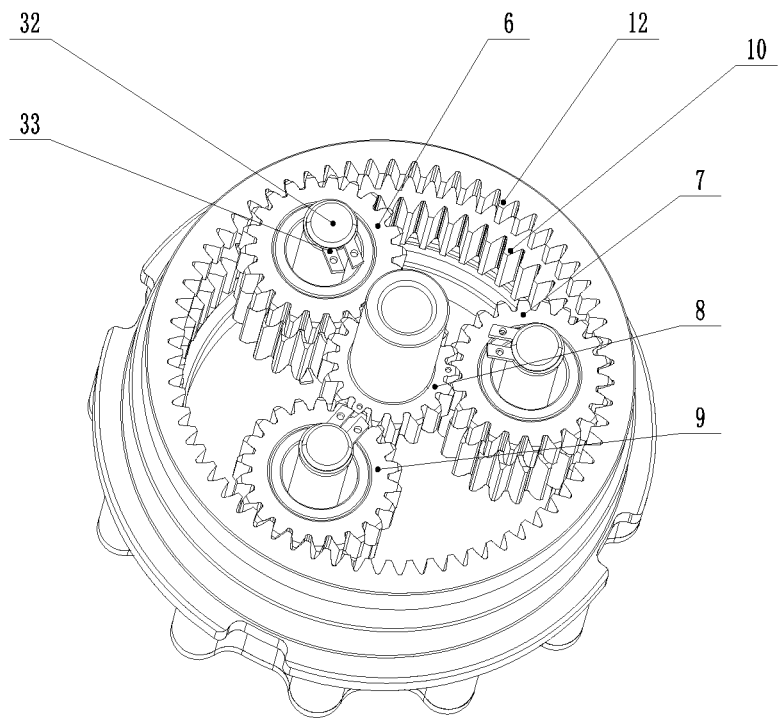
FIG. 5 is a schematic diagram showing an installation mode of duplex gears on a reducer according to another embodiment of the present disclosure.

In some embodiments, as illustrated in FIGS. 5, 8 and 10, the rotating frame 13 may serve as a support for the entire reducer, and the two ends thereof have through holes 131 respectively for inserting pins 32. The pins 32 may be inserted in the three set of duplex gears to assemble the duplex gears and the rotating frame 13 together. Both ends of the pin 32 may be fixed through the shaft end retaining ring 33. Further, the rotating frame welding gaps 11 are located at positions corresponding to the through holes 131 on the outer periphery of the rotating frame 13, so as to align with the fitting surface between the second gear 62 of each set of the duplex gears and the planetary gear shaft 60.

In some other embodiments, the machining device may also reverse the shaft of the duplex gears of the reducer, so as to perform alignment and welding on the other gear of each set of the duplex gears.

The present disclosure further provides a use method of the duplex gear machining device for a high-precision reducer for a robot described above, comprising the steps of:

(1) Connecting the reducer body with the rotary mechanism through the rotating shaft of the central gear, and fixing the output gear ring and the rotating frame;

(2) starting the rotary mechanism to drive the central gear to rotate, wherein the central gear drives each set of the duplex gears to rotate, and each set of the duplex gears and the two gears thereof are aligned in the rotating process; and (3) After the alignment, welding one gear, such as the second gear, in each set of the duplex gears by the laser welding device.

Before step (1), the use method may further comprise a step of assembling each set of the duplex gears, specifically, installing at least one gear, which may be an outer gear ring, of each set of the duplex gears on the shaft of the duplex gears by transition fit.

Further, tooth surfaces of the first set of duplex gears, the second set of duplex gears, the third set of duplex gears and the central gear are nitrided, so that the core of the gear has good toughness.

The above technical solutions in the embodiments of the present disclosure at least have the following technical effects or advantages:

1. In the machining device, several sets of duplex gears can be aligned at the same time, the initial machining of gear has no phase angle requirement, the gear machining precision will not be decreased after the gear alignment, no phase angle error will be generated, and the rotation precision of the reducer for a robot can be greatly improved. Since the gear alignment has no error and the load balancing performance is good, a large impact load can be borne, and the reliability of the reducer is improved. The present disclosure effectively solves the problems of sticking and heating of the transmission system and the reduction of the service life of the reducer caused by the errors generated by respectively aligning and welding sets of duplex gears, thereby eliminating the phase angle error, ensuring the machining precision of the duplex gears, and ensuring the output precision and the machining precision of the reducer.

2. The machining device of the present disclosure adopts the structure in which the rotating frame is fitted with the output gear ring, sets of duplex gears are aligned at the same time and then welded at one time without installation, thereby effectively solving the following problems: only one set of duplex gears can be aligned at a time by a gear aligning tool or a special gear aligning machine; sets of duplex gears need to be concentratedly installed and welded after the gear alignment; and a plurality of random errors are existed during the installation and welding, so that the overall performance of the reducer is degraded, and the use requirement cannot be met. Thus, the present disclosure ensures that sets of duplex gears are aligned at the same time and welded at one time, avoids the final installation step, does not need to consider the phase angle error of the duplex gears, self-adapts to the optimal phase angle between respective sets of duplex gears during the gear alignment, eliminates the gear alignment error of the reducer, and ensures that the overall performance of the reducer is allowable.

3. In the present disclosure, since the first set of duplex gears, the second set of duplex gears, the third set of duplex gears and the central gear adopt a fine-pitch high tooth profiles and their tooth surfaces are nitrided, and the damages of the gear, caused by a fatigue strength and an insufficient toughness, can be solved, so that the core of the gear has good toughness and the tooth surfaces have a hardness meeting the fatigue requirement. The present disclosure ensures that the teeth can be slightly deformed to adjust the side gap between the teeth of the gears during the entire alignment.

Although only some embodiments of the present disclosure has been described in detail as above, it is only some preferred embodiments of the present disclosure and should not be considered as a limitation to the scope of the present disclosure. Any equivalent change, improvement, etc. made in accordance with the protection scope of the present disclosure should still fall within the patent coverage scope of the present disclosure.

The invention claimed is:

1. A machining device for duplex gear of a high-precision reducer for a robot, comprising: a laser welding device, a laser rotary support, a rotary mechanism and a rotary platform; the rotary mechanism is installed with a reducer body which comprises a first set of duplex gears, a second set of duplex gears, a third set of duplex gears, a central gear, an output gear ring, rotating frame welding gaps, a fixed gear ring and a rotating frame; the center of the central gear is fixedly connected with a rotating shaft; the first set of duplex gears, the second set of duplex gears and the third set of duplex gears are disposed around the central gear at an equal interval;

each set of the duplex gears comprises a first gear and a second gear disposed coaxially; the central gear is connected with the first set of duplex gears, the second set of duplex gears and the third set of duplex gears through the second gear of each set of the duplex gears; the first set of duplex gears, the second set of duplex gears and the third set of duplex gears are connected with the output gear ring through a first gear ring of each set of the duplex gears; the fixed gear ring is disposed above the output gear ring and connected with each set of the duplex gears through the second gear;

the rotating frame is disposed at ends, close to the top of the reducer, of rotating shafts of the first set of duplex gears, the second set of duplex gears, the third set of duplex gears and the central gear; the rotating frame welding gaps are formed in positions, close to respective rotating shafts of duplex gears, on the side edge of the rotating frame, so as to partly expose respective duplex gears and the rotating shafts thereof; and the rotary mechanism is disposed at a center of the rotary platform, the rotary mechanism is fixedly connected with the rotating shaft of the central gear, the laser rotary support is disposed on the rotary platform and close to a side surface, the laser welding device is disposed on the top of the laser rotary support, and a welding head of the laser welding device can be disposed directly above the rotating frame welding gap.

2. The machining device for duplex gear of a high-precision reducer for a robot according to claim 1, wherein two gears of each of the first set of duplex gears, the second set of duplex gears and the third set of duplex gears are in transition fit with the rotating shaft thereof, and the first set of duplex gears, the second set of duplex gears, the third set of duplex gears and the central gear have fine-pitch high tooth profiles.

3. The machining device for duplex gear of a high-precision reducer for a robot according to claim 1, wherein through holes are formed in positions corresponding to the rotating shafts of respective duplex gears at the top of the rotating frame.

4. The machining device for duplex gear of a high-precision reducer for a robot according to claim 1, wherein an outer side of the output gear ring is disposed as a wave shape, and a through hole is disposed at a center of each convex portion.

5. The machining device for duplex gear of a high-precision reducer for a robot according to claim 1, further comprising a carrying platform disposed over the rotary mechanism to install the reducer body.

6. The machining device for duplex gear of a high-precision reducer for a robot according to claim 1, wherein the number of the rotating frame welding gaps is the same as the number of the sets of duplex gears.

7. A use method of the machining device for duplex gear of a high-precision reducer for a robot according to claim 1, comprising:

connecting the reducer body with the rotary mechanism through the rotating shaft of the central gear, and fixing the output gear ring and the rotating frame;

starting the rotary mechanism to drive the central gear to rotate, wherein the central gear drives the first set of duplex gear, the second set of duplex gear and the third set of duplex gear to rotate, and the first set of duplex gear, the second set of duplex gear and the third set of duplex gear are aligned in the rotating process; and after the alignment, welding the first set of duplex gear, the second set of duplex gear and the third set of duplex gear by the laser welding device.

8. The use method of the machining device for duplex gear of a high-precision reducer for a robot according to claim 7, wherein tooth surfaces of the first set of duplex gear, the second set of duplex gear, the third set of duplex gear and the central gear are nitrided.

* * * * *